United States Patent

[11] 3,620,732

[72] Inventors Hartmut Steppan
Wiesbaden-Dotzheim;
Karl Josef Rauterkus, Kelkheim; Detlev Seip, Hofheim/Tansus, all of Germany

[21] Appl. No. 697,621
[22] Filed Jan. 15, 1968
[45] Patented Nov. 16, 1971
[73] Assignee Kalle Aktiengesellschaft
Wiesbaden-Biebrich, Germany
[32] Priority Jan. 18, 1967
[33] Germany
[31] F 51275

[54] PROCESS FOR THE PREPARATION OF WATER-INSOLUBLE REPRODUCTION LAYERS AND FOR THEIR SUBSEQUENT IMAGE-WISE DIFFERENTIATION
13 Claims, No Drawings

[52] U.S. Cl. .......... 96/33, 96/35.1, 96/115 R
[51] Int. Cl. .......... G03c 1/68, G03c 1/70
[50] Field of Search .......... 96/115, 35.1, 33

[56] References Cited

UNITED STATES PATENTS

| | | | |
|---|---|---|---|
| 2,831,768 | 4/1958 | Merrill et al. | 96/115 |
| 3,120,564 | 2/1964 | Milionis et al. | 252/300 X |
| 3,183,219 | 5/1965 | Schuler | 96/84 X |
| 3,214,492 | 10/1965 | Tocker | 260/878 |
| 3,341,493 | 9/1967 | Goldberg et al. | 260/47 |
| 3,418,118 | 12/1968 | Thommes et al. | 96/115 X |
| 3,453,110 | 7/1969 | Delzenne et al. | 96/115 X |

*Primary Examiner*—Ronald H. Smith
*Attorney*—James E. Bryan

ABSTRACT: This invention relates to a process for the preparation of water-insoluble reproduction layers and also a process for the use of such layers. In the process of preparation, a suitable support is coated with an aqueous dispersion of a water-insoluble, inherently light-sensitive polymer, and the coated dispersion is solidified into a film, with simultaneous removal of the water. In the process for using the film, the latter is imagewise exposed to light and then imagewise differentiated by means of a developing process.

PROCESS FOR THE PREPARATION OF WATER-INSOLUBLE REPRODUCTION LAYERS AND FOR THEIR SUBSEQUENT IMAGE-WISE DIFFERENTIATION

It is known to prepare a reproduction layer consisting of or containing water-insoluble components by applying the components to a support in the form of a solution in an organic solvent and then evaporating the solvent, and to prepare a copy by image-wise exposing the resulting reproduction layer and producing the copy of the original by a suitable developing process, e.g., a washing process.

This process has the disadvantage that the coating process is somewhat dangerous and expensive. Frequently, toxic solvents must be used, so that the preparation of the coating solution, and the coating process itself, involve health hazards. Furthermore, the air which is used in the drying process, and thus contains solvents, can not be directly conducted away to the atmosphere. Therefore, and in some cases also because of the high price of the solvents, expensive installations for the recovery of the solvents are necessary.

The presence of solvent vapor-air mixtures near the coating machines also renders it necessary to install technically complicated, and thus expensive, apparatus for avoiding explosions.

In some cases, it is also difficult to remove the solvent completely from the reproduction layer during the drying process, particularly when solvents are used which have a relatively high boiling point or which tend to form association compounds with the components of the layer.

Further, it is known to prepare water-insoluble reproduction layers by spread-coating, or by pressing-on or rolling-on of the layer at an elevated temperature, in a softened condition, i.e., quasi from a melt. This process has the disadvantage that the components of the layer are subjected to a rather high thermal stress, which may cause decomposition or other alterations of the layer components.

Further, a process is known for the preparation of special reproduction layers, wherein a system comprising a plurality of components, but no organic solvents, is applied to a support in the form of an aqueous dispersion, dried, and finally processed into copies in the manner described above.

This coating mixture contains as the most important components:

1. a monomeric compound which is not in the gaseous phase and contains at least one terminal, ethylenically unsaturated group,
2. an aqueous dispersion of a water-insoluble polymer capable of forming a homogeneous film upon consolidation,
3. a photopolymerization initiator (radical type), and
4. a surface-active substance.

Components 1–4 must blend with one another, so that the coating mixture does not deflocculate and a homogeneous layer is formed upon drying.

This process has the disadvantage that in order to prepare the light-sensitive mixture, which must be applied in the form of an aqueous dispersion, the photo initiators, e.g., those of the multinuclear quinone type, which crystallize very readily, are insoluble in water, and are generally also sparingly soluble in organic media, must be dispersed.

A further disadvantage of this process is the fact that, during drying of the composition, evaporation losses may occur in the case of a number of the ethylenically unsaturated monomers referred to above. In addition thereto, dissolved solid substances, such as the photopolymerization initiators, may deposit on the reproduction layer in the form of an undesirable blooming.

A process now has been found for the preparation of water-insoluble reproduction layers which avoids the disadvantages of the above-mentioned processes. In the process, a suitable support is coated with an aqueous dispersion of a water-insoluble, inherently light-sensitive polymer, the coated dispersion is solidified into a film, with simultaneous removal of the water, the film is image-wise exposed, and then image-wise differentiated by means of a developing process.

The dispersions of inherently light-sensitive polymers used in the present invention may be obtained by dispersing the light-sensitive polymers. which may be prepared by substance polymerization, solution polymerization or bead polymerization, in the presence of suitable emulsifiers or by emulsion polymerization. The latter method for preparing the dispersions is preferred, among other reasons because no organic solvents need be used for the preparation of the dispersion and the process is simpler.

According to a particularly advantageous embodiment of the process of the invention, not only the monomers used contain photoactive groups, but also the emulsifiers, because the emulsifiers containing photoactive groups react under the influence of light with the polymers formed from the monomers and thus become firmly attached to the polymers. This causes also the exposed films prepared from these dispersions to become considerably more resistant to water, since it is no longer possible to remove the emulsifier by washing.

Of the light-sensitive monomers the copolymerization of which with nonphotoactive monomers proceeds in the dark without undesirable side reactions, those preferably are used which correspond to one of the following general formulas I to IV:

I.

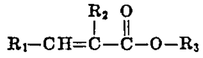

II.

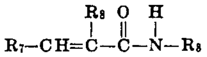

III.

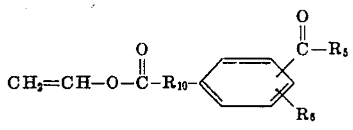

IV.

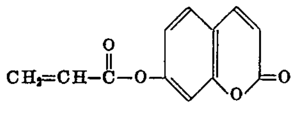

in which:

$R_1$ is H,$COOR_3$ or COO-alkyl;

$R_2$ is H,alkyl, $CH_2COO$-alkyl or $CH_2COOR_3$, wherein only one of the substituents $R_1$ and $R_2$ must contain the oxycarbonyl group COO, $R_3$ is

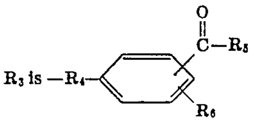

$R_4$ is single bond or $-CH_2$ or $CH_2-CH_2O$, $R_5$ is alkyl, phenyl, alkaryl, alkoxyaryl or halogenaryl, $R_6$ is H, alkyl, alkoxy or halogen, $R_7$ is H, $$-CON(H)-R_9$$

-COO-alkyl, $-COOR_3$ or -COOH,, $R_8$ is H, alkyl, $CH_2$-CONH-alkyl, $CH_2-CONHR_9$, $CH_2$-COOBalkyl, $CH_2-COOR_3$ or $CH_2-COOH$, wherein only one of the substituents $R_7$ and $R_8$ must contain the carbonyl group CO and wherein further, in the case of the monomers corresponding to Formula II above which are itaconic acid derivatives, the carboxylic acid functions -NH-alkyl, -O-alkyl, $OR_3$ and -OH described for the substituent $R_8$ may replace the substituent $-NH-R_9$, and vice versa, $R_9$ is

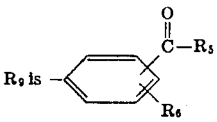

and $R_{10}$ is a single bond or $-CH_2-O-$.

Copolymers containing photoactive monomers carrying benzophenone groupings are preferably used, since they possess a higher light-sensitivity than the acetophenone derivatives.

Light-sensitive emulsifiers which may be used in accordance with the present invention are the nonionic products obtainable by the reaction of 1 mole of 4-hydroxybenzophenone with, e.g., 1 to 200 moles, preferably 4 to 60 moles of ethylene oxide.

In addition to the above-described photoactive monomers, there may be used for the preparation of the dispersions those monomers which are capable of copolymerization with the first-mentioned monomers, but yield water-insoluble polymers. For instance, one or more of the following monomers may be included by copolymerization: vinyl esters, such as vinyl acetate or vinyl propionate; acryl esters, such as ethyl acrylate, methylmethacrylate, butylacrylate or octylacrylate; vinyl ethers; vinyl or vinylidene halides, such as vinyl chloride or vinylidene chloride; acrylonitrile; styrene; acrylic acid; vinyl sulfonic acid; and itaconic acid, the last-mentioned acidic monomers being included in the copolymerizates in a proportion of less than 5 percent by weight. Copolymerizates of this kind result in an increased stability of the dispersions, on the one hand, and an improvement of the adhesion to a number of metal supports, on the other hand.

The sole criterion for the selection of the monomers and their combination with one another is the requirement that the dispersions made therefrom form films upon drying which advantageously should be homogeneous and nontacky.

The light-sensitive vinyl monomers are used in a quantity of at least 1 percent weight, calculated on the sum of all monomers present. Normally, quantities above 40 percent by weight are not employed, since the use of such large quantities is not justified by the effect obtained. The preferred range is between 1 and 20 percent by weight of photoactive monomers.

The photoactive emulsifier normally is added in a quantity ranging from 1 to 20 percent by weight, preferably from 1 to 15 percent, calculated on the sum of monomers present, either as the sole emulsifier, or in combination with other emulsifiers which are not photoactive but must, of course, be compatible with the photoactive emulsifier.

Various additives may be added to the dispersions of the inherently light-sensitive polymers, provided they do not destroy the stability of the dispersion. Sensitizers, plasticizers, stabilizers, wetting agents, pigments and dyestuffs are exemplary, the selection of the additives being made in such a manner that they do not unduly weaken the wave length range necessary for photocross-linking.

Generally, the quantity of nonphotoactive additives should not exceed 30 percent by weight of the photoactive polymer (solids) present.

Suitable supporting materials for use in process according to the invention are, e.g.: paper having improved water-resistance, plastic films, e.g., polyamide films, polyester films, metal foils or plates, e.g., plates or foils of iron, aluminum, zinc, copper, or chromium, or multimetal foils, e.g., iron/copper/chromium foils, aluminum/copper/chromium foils or aluminum/copper foils as well as glass and ceramics. Advantageously, the adhesive qualities of metal surfaces are improved before coating, e.g., by chemical or mechanical pretreatment. Coating may be performed, e.g., by immersion, casting and draining, casting and centrifuging, roller application, swabbing or brushing. The coated dispersion then is caused to solidify into a film at normal or elevated temperatures.

For the preparation of copies, the reproduction material, consisting of the support with the light-sensitive film thereon, is image-wise exposed under a negative, e.g., a line negative. After exposure, the unexposed areas of the layer are removed by means of suitable solvents; positive copies result. By this process, tanned images, relief images and printing plates may be produced.

The process of the invention will be further illustrated by the following examples. Parts by weight are in grams, parts by volume in milliliters, the temperatures stated refer to degrees Centigrade, and percentages are by weight.

EXAMPLE 1

For the preparation of a light-sensitive material, which is suitable, inter alia, for the manufacture of a planographic printing plate, an electrolytically roughened aluminum foil is coated, by swabbing, with a dispersion (54.4 percent solids content) obtained by the emulsion polymerization of 80 parts by weight of vinyl acetate, 20 parts by weight of dibutyl maleinate, and 1 part by weight of the light-sensitive monomer corresponding to the following formula

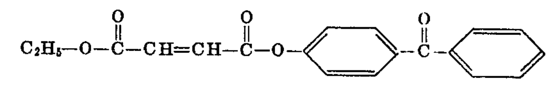

which polymerizate is then diluted with water at a ratio of 1:3. The layer is first superficially dried by means of a current of warm air and then thoroughly dried for 2 minutes at 100° C.

The light sensitive material thus obtained may be stored for a long time in the dark without losing any of its sensitivity. When the material is used, it is exposed for 6 minutes under a line negative to the light of a tubular exposure device consisting of 13 fluorescent tubes of the type Philips TL-AK-40 W/05 arranged on a 60×60 cm. area. (Distance of the lamp: 7–8 cm. cover foil: polyvinyl chloride).

The foil then is developed by wiping it lightly with methanol or ethanol, rinsing it with alcohol, and drying. It is then wiped over with an about 1.5 percent aqueous solution of phosphoric acid, inked up with protective ink, and again cleaned with dilute phosphoric acid. A positive planographic printing plate is thus obtained which may be used for printing in a conventional offset printing apparatus.

The following method is used to prepare the polymer:

A bath consisting of

| | |
|---|---|
| 42.0 parts by weight | water |
| 15.0 parts by weight of | a 10 percent aqueous solution of a polyvinyl alcohol containing a residual acetyl content of about 10 percent (prepared by alkaline saponification of polyvinyl acetate of a K-value of 30) |
| 40.00 parts by weight of | a 10 percent aqueous solution of an oxethylation product prepared from 1 mole of nonyl phenol and 30 moles of ethylene oxide |
| 2.0 parts by weight of | a polypropylene glycol oxethylated with 10 percent by weight of ethylene oxide |
| 0.6 parts by weight of | the sodium salt of vinyl sulfonic acid (25% aqueous solution) |
| 0.25 parts by weight of | sodium acetate (anhydrous) |
| 0.41 parts by weight of | potassium persulfate, and |

Ten percent by weight of the monomer mixture described below, is heated to 80° C. with stirring while excluding air. The remainder of the monomer mixture is cautiously added over 1 to 2 hours. Then, 0.09 part by weight of potassium persulfate, dissolved in a small quantity of water, is added. Stirring is continued for 1 hour at 90° C.

The following monomer mixture was used: 80 parts by weight of vinyl acetate, 20 parts by weight of dibutyl maleinate, and 1 part by weight of the photoactive monomer described at the beginning of this example.

The solids content of the dispersion was 54.4 percent.

EXAMPLE 2

An electrolytically roughened aluminum foil is knife coated with the dispersions of the following composition in such a manner that a film weighing 1.0 to 1.2 g./dm.$^2$ results from the solidified dispersions:

a. A dispersion prepared from 80 parts by weight of vinyl acetate, 20 parts by weight of dibutyl maleinate, and 1 part by weight of the monomer corresponding to the formula

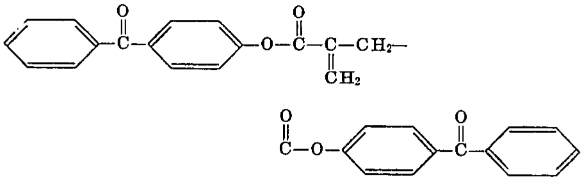

Solids contents of the dispersion: 49.4% b. A dispersion prepared from 80 parts by weight of vinyl acetate, 20 parts by weight of dibutyl maleinate, and 1 part by weight of the monomer of the following structure:

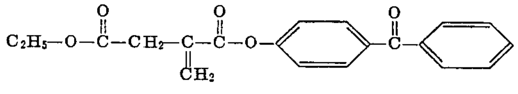

Solids contents of the dispersion: 57.1%

The light-sensitive materials obtained in this manner can be stored in the dark for a long time. In use, they are exposed for 5 to 10 minutes under a transparent line original to the light of the light source described in example 1. The unexposed areas of the layer are then removed by bathing them in ethyl acetate and by a cautious spraying with the same solvent. Upon drying, a colorless relief image is obtained which may be dyed a vivid blue by bathing it in a solution of Victoria Blue B (Color Index No. 44,045) in ethanol and spraying with water. The two dispersions are prepared according to the method described in example 1.

By the same method, but with a longer exposure time (10 to 20 minutes, under otherwise identical conditions) a relief image was obtained with a dispersion of a copolymer having the following composition: 13.7 parts by weight of methylmethacrylate, 11.3 parts by weight of butylacrylate, and 0.25 part by weight of monomer of the formula

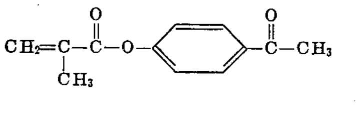

which was prepared analogously to the method described in example 5. The image could be dyed blue in the same manner.

The solids content of the dispersion was 41.8 percent, and it was diluted with water at a ratio of 1:3 for coating. Coating was performed on a whirl coater, and the plate was developed as described above.

EXAMPLE 3

An electrolytically roughened aluminum support is coated with a light-sensitive dispersion prepared from 40 parts by weight of styrene, 10 parts by weight of acrylonitrile, 50 parts by weight of butylacrylate, and 5 parts by weight of the photoactive monomer of formula

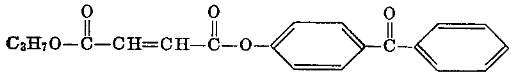

and having a solids contents of 33.8 percent. The film formed by consolidation of the dispersion layer was 0.035 mm. thick.

Exposure and development of the light-sensitive material thus obtained are effected as described in example 2. A relief image is obtained which may be colored a deep black by immersing it for a short time into a solution of Sudan Black (Color Index No. 26,150) in dioxane.

For the preparation of the dispersion, a bath consisting of 198 parts by weight of water, 2 parts by weight of sodium lauryl sulfate, and 0.4 part by weight of potassium persulfate is heated to 60° C., 10 percent of the monomer mixture is added, the mixture is heated to 80° C. and the remainder of the monomer mixture is then cautiously added over a period of 2 hours. Fifteen minutes before adding the last of the monomer mixture, 0.1 part by weight of potassium persulfate, dissolved in 2 parts by volume of water, is added. The composition of the monomer mixture is stated at the beginning of this example. The dispersion has a solids content of 33.8 percent.

EXAMPLE 4

A polyethylene terephthalate foil which had been matted by sandblasting is coated with a light-sensitive dispersion containing 66.6 parts by weight of vinyl acetate, 33.3 parts by weight of the vinyl ester of a mixture of aliphatic carboxylic acids branched in the α-position and having from nine to 11 carbon atoms (boiling point 205° to 262° C. at a pressure of 760 mm. Hg), and 2 parts by weight of a light-sensitive monomer having the formula

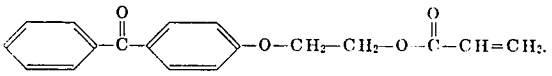

The dispersion layer is then solidified into a film.

Imagewise exposure of the material thus produced was performed under the conditions stated in example 1, using a negative original with writing thereon; the exposure time was 5 minutes. Advantageously, the foil is backed during exposure with a material which does not reflect ultraviolet light. By spraying with ethyl acetate, drying, immersion in a solution of Victoria Blue B (Color Index No. 44,045) in ethanol or a solution of Sudan Black (Color Index No. 26,150) in dioxane, spraying again with water, and drying, a blue- or black-tanned image, respectively, is produced on a transparent support.

The dispersion is prepared as follows: In a glass vessel equipped with a stirrer, a thermometer, a dropping funnel and a reflux condenser a solution is heated to 80° C. which contains 4 parts by weight of oxethylated nonyl phenol (30 moles of ethylene oxide per mole of nonyl phenol), 0.15 part by weight of the sodium salt of vinyl sulfonic acid, 2 parts by weight of oxethylated propylene glycol having a molecular weight of 2,000 (prepared with 10 percent of ethylene oxide), 1.5 parts by weight of a polyvinyl alcohol having a K-value of 30, and 0.42 part by weight of a potassium persulfate in 105 parts by weight of water. Thereafter, dropwise addition of the above-described monomer mixture (100 parts by weight) is begun. After the monomer mixture has been added dropwise, a solution of 0.1 part by weight of potassium persulfate in 2.5 parts by weight of water is added and heating is continued for 2 hours. The mixture is then cooled to room temperature.

The solids content of the dispersion was 49 percent. For coating, 1 part by weight of the dispersion was diluted with 2 parts by weight of water.

EXAMPLE 5

An inscription is applied to an aluminum plate as follows: An electrolytically roughened aluminum plate is swabbed with a light-sensitive dispersion (solids content: 21.5 percent) to which 10 percent by weight of carbon black (Farbruss Fw 2, manufactured by Degussa) are added, based on the solids content of the dispersion.

After the dispersion has solidified into a film, it is after-dried for 2 minutes at 100° C. By exposure under a negative of the desired inscription (exposure time: 5 to 10 minutes under the exposure device described in example 1) and spraying with acetone, the black, marginally sharp inscription becomes visible.

For the preparation of the light-sensitive dispersion, a bath consisting of

| | |
|---|---|
| 35.5 parts by weight of | water |
| 2.0 parts by weight of | a 25% aqueous solution of the sodium salt of vinyl sulfonic acid |
| 0.25 parts by weight of | a 10% aqueous solution of an oxethylation product of 1 mole of nonyl phenol and 10 moles of ethylene oxide |
| 0.5 parts by weight of | sodium lauryl sulfate, and |
| 0.1 parts by weight of | potassium persulfate |

was heated to 60° C., then 10 percent of the monomer mixture described below was added, the temperature was raised to 75° C., and then the remainder of the monomer mixture was cautiously introduced over a period of 90 minutes. Finally, 0.025 part by weight of potassium persulfate, dissolved in 0.5 part by volume of water, was added and the mixture was stirred for 2 hours at 80° C.

The monomer mixture consisted of: 13.7 parts by weight of methylmethacrylate, 11.2 parts by weight of butylacrylate, and 1.25 parts by weight of a photoactive monomer of the formula

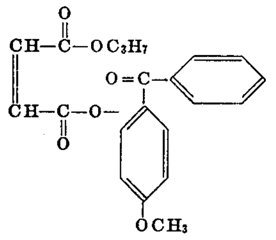

EXAMPLE 6

Baryta paper is coated with an aqueous dispersion of a copolymer prepared from 11.2 parts by weight of methylmethacrylate, 13.7 parts by weight of butylacrylate, and 1.25 parts by weight of a monomer of the formula

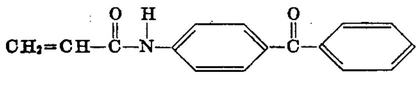

(the dispersion was prepared as described in example 5; its solids content is 40.7 percent, after it had been diluted with water to a solids content of 13.5 percent, and the layer thus formed is dried to solidify it into a film.

The material is exposed for 2 to 3 minutes under a positive line original and developed by spraying it with ethyl acetate.

After drying, the material is wiped over with an aqueous solution of Crystal Violet (Color Index No. 42,555), whereby the bared paper support is vividly colored, while the photocross-linked layer accepts practically no color.

A positive copy of the original is thus produced.

Alternatively, a pigment, e.g., Heliogen B powder (Color Index No. 74,160) may be added to the dispersion in a quantity of 20 percent by weight, based on the solids content of the dispersion, and the mixture then may be applied to a baryta paper or a sandblasted polyethylene terephthalate film analogously to the method stated in example 4, and negative, colored-tanned images then may be produced.

EXAMPLE 7

An electrolytically roughened aluminum foil is coated with a water-diluted copolymer dispersion (solids content: 13.5 percent) which had been prepared analogously to the method described in example 5, using, however, the following monomers: 11.25 parts by weight of methylmethacrylate, 13.75 parts by weight of butylacrylate, and 1.25 parts by weight of a monomer of the formula

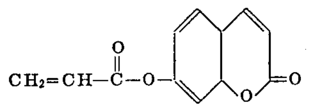

(Solids content of the dispersion: 40 percent).

The dispersion layer was solidified into a film and then exposed, for 2 minutes under a line negative, to the light of the exposure device described in example 1. For development, the foil is sprayed with ethyl acetate. In order to produce a colored copy of the original the foil is immersed in a dioxane solution of Sudan Black (C.I. 26,150), sprayed with water and dried. A positive copy of the original is thus obtained.

EXAMPLE 8

An electrolytically roughened aluminum foil is coated with an aqueous dispersion of a photoactive polymer which contains also a photoactive emulsifier. The preparation of the dispersion is described below.

After drying, the coated layer was exposed for 2 minutes under a negative under the conditions stated in example 1. It then was developed by spraying with ethyl acetate, dried, immersed in a 1 percent solution of Sudan Black (Color Index No. 26,150) in dioxane, sprayed with water and dried. A black-colored, positive copy results.

The dispersion is prepared as follows: A solution of

| | |
|---|---|
| 2.0 parts by weight of | oxethylated nonyl phenol (30 moles of ethylene oxide per mole of nonyl phenol) |
| 1.0 parts by weight of | oxethylated propylene oxide of a molecular weight of 2,000 (10% of ethylene oxide) |
| 2.0 parts by weight of | oxethylated p-hydroxybenzophenone (14 moles of ethylene oxide per mole of p-hydroxybenzophenone) |
| 1.0 parts by weight of | oxethylated p-hydroxybenzophenone (7 moles of ethylene oxide per mole of p-hydroxybenzophenone) |
| 1.5 parts by weight of | poly-N-vinyl-2-pyrrolidone |
| 0.15 parts by weight of | sodium salt of vinyl sulfonic acid |
| 0.25 parts by weight of | sodium acetate, and |
| 0.42 parts by weight of | potassium persulfate in |
| 105.00 parts by weight of | water |

is heated to 80° C. in a glass vessel. Thereafter, a monomer mixture consisting of 67.0 parts by weight of vinyl acetate, 33.0 parts by weight of the vinyl ester of a mixture of aliphatic carboxylic acids branched in the $\alpha$-position and having from nine to 11 carbon atoms (boiling point 205° to 262° C. at a pressure of 780 mm. Hg), and 2.0 parts by weight of p-benzoylphenoxy acetic acid vinyl ester is slowly added drop by drop. After all the mixture has been added, a solution of 0.1 part by weight of potassium persulfate in 2.5 parts by weight of water is added and heating is continued for 2 hours. The mixture is then cooled to room temperature.

It will be obvious to those skilled in the art that many modifications may be made within the scope of the present invention without departing from the spirit thereof, and the invention includes all such modifications.

What is claimed is:

1. A process for the preparation of a water-insoluble reproduction layer which comprises coating a water-resistant support with a layer of an aqueous dispersion of an inherently light-sensitive copolymer of at least one light-insensitive vinyl or vinylidene monomer selected from the group consisting of a vinyl ester, an acryl ester, a vinyl ether, a vinyl halide, a vinylidene halide, acrylonitrile, styrene, acrylic acid, vinyl sulfonic acid, and itaconic acid, with at least one light-sensitive vinyl monomer of the following general formulae I, II and III

I.

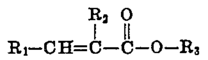

II.

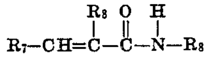

III.

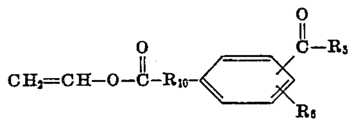

in which:

$R_1$ is H, $COOR_3$ or COO-alkyl;

$R_2$ is H, alkyl, $CH_2COO$-alkyl or $CH_2COOR_3$ wherein only one of the substituents $R_1$ and $R_2$ may contain the oxycarbonyl group COO,

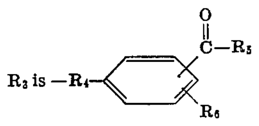

$R_4$ is a single bond or $-CH_2$ or $CH_2-CH_2O$, $R_5$ is alkyl, phenyl, alkaryl, alkoxyaryl or halogenaryl, $R_6$ is H, alkyl, alkoxy or halogen, $R_7$ is H,

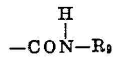

-COO-alkyl, $-COOR_3$ or COOH, $R_8$ is H, alkyl, $CH_2-CONH$-alkyl, $CH_2-CONHR_9$, $CH_2-COO$-alkyl, $CH_2-COOR_3$ OR $CH_2-COOH$, wherein only one of the substituents $R_7$ and $R_8$ may contain the carbonyl group CO and wherein further, in the case of the monomers corresponding to formula II above which are itaconic acid derivatives, the carboxylic acid functions -NH-alkyl, -O-alkyl, $OR_3$ and -OH described for the substituent $R_8$ may replace the substituent $-NH-R_9$, and vice versa,

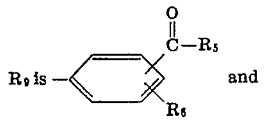

$R_{10}$ is a single bond or $-CH_2-O-$.

in which:

$R_1$ is H, $COOR_3$ or COO-alkyl;

$R_2$ is H, alkyl $CH_2COO$-alkyl or $CH_2COOR_3$wherein only one of the substituents $R_1$ and $R_2$ may contain the oxycarbonxyl group COO,

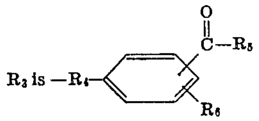

$R_4$ is a single bond or $-CH_2$ or $CH_2-CH_2O$, $R_5$ is alkyl, phenyl, alkaryl, alkoxyaryl or halogenaryl, $R_6$ is H, alkyl, alkoxy or halogen, $R_7$ is H,

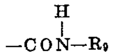

-COO-alkyl, $-COOR_3$ or -COOH, $R_8$ is H, alkyl, $CH_2-CONH$-alkyl, $CH_2-CONHR_9$, $CH_2-COO$-alkyl, $CH_2-COOR_3$ or $CH_2-COOH$, wherein only one of the substituents $R_7$ and $R_8$ may contain the carbonyl group CO and further, in the case of the monomers corresponding to formula II above which are itaconic acid derivatives, the carboxylic acid functions -NH-alkyl, -O-alkyl, $OR_3$ and -OH described for the substituent $R_8$ may replace the substituent $-NH-R_9$, and vice versa,

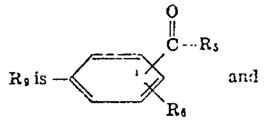

$R_{10}$ is a single bond or $-CH_2-O-$.

2. A process according to claim 1 in which the light-sensitive monomer has the formula

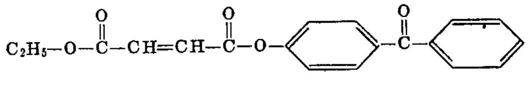

3. A process according to claim 1 in which the light-sensitive monomer has the formula

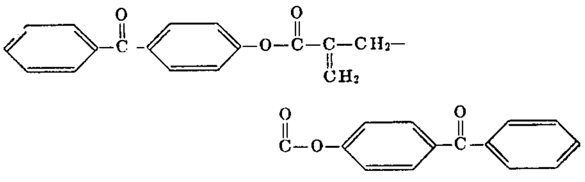

4. A process according to claim 1 in which the light sensitive monomer has the formula

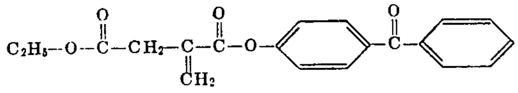

5. A process according to claim 1 in which the light-sensitive monomer has the formula

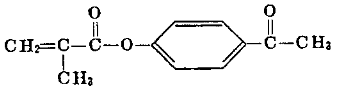

6. A process according to claim 1 in which the light-sensitive monomer has the formula

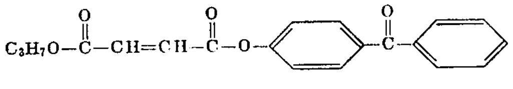

7. A process according to claim 1 in which the light-sensitive monomer has the formula

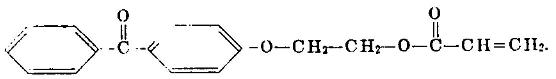

8. A process according to claim 1 in which the light-sensitive monomer has the formula

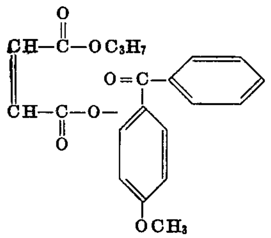

9. A process according to claim 1 in which the light-sensitive monomer has the formula

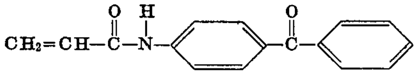

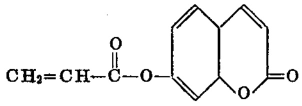

10. A process according to claim 1 in which the dispersion includes a photoactive emulsifier of the formula

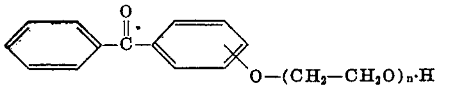

in which n is an integer from 1 to 200.

11. A supported light-sensitive reproduction layer comprising a water-insoluble copolymer of an effective amount of at least one light-insensitive vinyl or vinylidene monomer selected from the group consisting of a vinyl ester, an acryl ester, a vinyl ether, a vinyl halide, a vinylidene halide, acrylonitrile, styrene, acrylic acid, vinyl sulfonic acid, and itaconic acid, an effective amount of at least one light-sensitive monomer of the following general formulae I, II, and III:

I. $$R_1-CH=C(R_2)-C(=O)-O-R_3$$

II $$R_7-CH=C(R_8)-C(=O)-N(H)-R_9$$

III

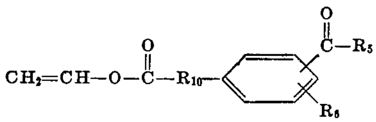

in which:

$R_1$ is H, $COOR_3$ or COO-alkyl;

$R_2$ is H, alkyl, $CH_2COO$-alkyl or $CH_2COOR_3$, wherein only one of the substituents $R_1$ and $R_2$ may contain the oxycarbonyl group COO,

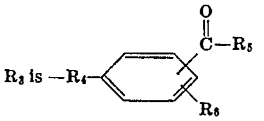

$R_4$ is a single bond or $-CH_2$ or $CH_2-CH_2O$, $R_5$ is alkyl, phenyl, alkaryl, alkoxyaryl or halogenaryl, $R_6$ is H, alkyl, alkoxy or halogen, $R_7$ is H, $$-CON(H)-R_9$$

-COO-alkyl, -COO-alkyl, $-COOR_3$ or -COOH, $R_8$ is H, alkyl, $CH_2$-CONH-alkyl, $CH_2-CONHR_9$, $CH_2$-COO-alkyl, $CH_2-COOR_3$ or $CH_2COOH$, wherein only one of the substituents $R_7$ and $R_8$ may contain the carbonyl group CO and wherein further, in the case of monomers corresponding to Formula II above which are itaconic acid derivatives, the carboxylic acid functions -NH-alkyl, -O-alkyl, $OR_3$ and -OH described for the substituent $R_8$ may replace the substituent $-NH-R_9$, and vice versa,

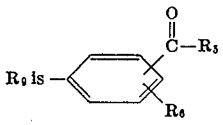

and $R_{10}$ is a single bond or $-CH_2-O-$, and a photoactive compound of the formula

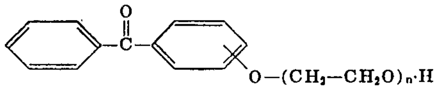

in which n is an integer from 1 to 200.

12. A process which comprises exposing a supported light-sensitive reproduction layer to light under a master and developing the resulting image with an organic solvent, the layer comprising a water-insoluble copolymer of an effective amount of at least one light-insensitive vinyl or vinylidene monomer selected from the group consisting of a vinyl ester, an acryl ester, a vinyl ether, a vinyl halide, a vinylidene halide, acrylonitrile, styrene, acrylic acid, vinyl sulfonic acid, and itaconic acid, an effective amount of at least one light-sensitive monomer of the following general formulas I, II, and III,

I $$R_1-CH=C(R_2)-C(=O)-O-R_3$$

II $$R_7-CH=C(R_8)-C(=O)-N(H)-R_9$$

III

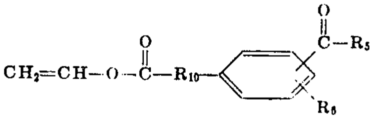

in which:

$R_1$ is H, $COOR_3$ or COO-alkyl;

$R_2$ is H, alkyl, $CH_2COO$-alkyl or $CH_2COOR_3$, wherein only one of the substituents $R_1$ and $R_2$ may contain the oxycarbonyl group COO,

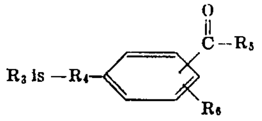

$R_4$ is a single bond or $-CH_2$ or $CH_2-CH_2O$, $R_5$ is an alkyl, phenyl, alkaryl, alkoxyaryl or halogenaryl, $R_6$ is H, alkyl, alkoxy or halogen, $R_7$ is H, $$-CON(H)-R_9$$

-COO-alkyl, $-COOR_3$ or -COOH, $R_8$ is H, alkyl, $CH_2$-CONH-alkyl, $CH_2-CONHR_9$, $CH_2$-COO-alkyl, $CH_2-COOR_3$ or $CH_2$-COOH, wherein only one of the substituents $R_7$ and $R_8$ may contain the carbonyl group CO and wherein further, in the case of the monomers corresponding to formula II above which are itaconic acid derivatives, the carboxylic acid functions -NH-alkyl, -O-alkyl, $OR_3$ and -OH described for the substituent $R_8$ may replace the substituent-NH-$R_9$, and vice versa.

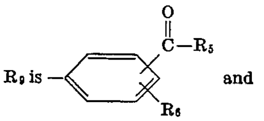

$R_{10}$ is a single bond or $-CH_2-O-$, and a photoactive compound of the formula

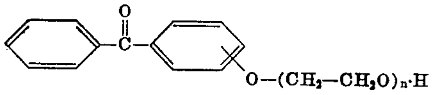

in which n in an integer from 1 to 200.

13. A supported light-sensitive reproduction layer comprising a water-insoluble copolymer of an effective amount of at least one light-insensitive vinyl or vinylidene monomer selected from the group consisting of a vinyl ester, an acryl ester, a vinyl ether, a vinyl halide, a vinylidene halide, acrylonitrile, styrene, acrylic acid, vinyl sulfonic acid, and itaconic acid, and an effective amount of at least one of the following light-sensitive monomers:

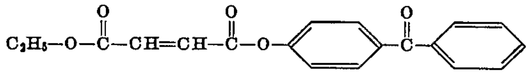

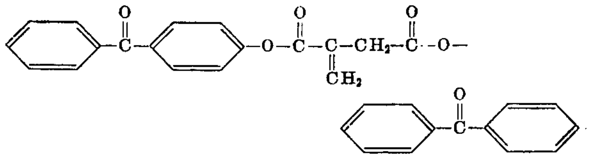

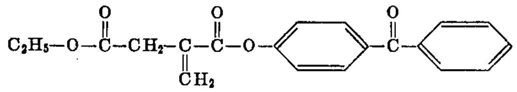

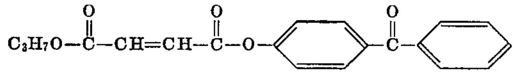

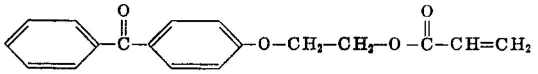

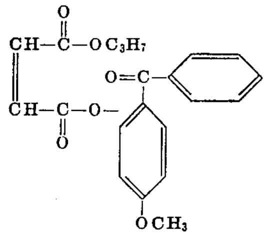

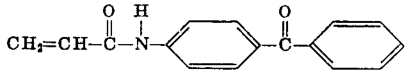

* * * * *

UNITED STATES PATENT OFFICE
CERTIFICATE OF CORRECTION

Patent No. 3,620,732 Dated November 16, 1971

Inventor(s) Hartmut Steppan, Karl Josef Rauterkus, and Detlev Seip

It is certified that error appears in the above-identified patent and that said Letters Patent are hereby corrected as shown below:

Column 2, line 30, and column 9, line 17, "$R_7-CH=C(R_8)-C(=O)-N(H)-R_8$" should read --- $R_7-CH=C(R_8)-C(=O)-N(H)-R_9$ ---.

Column 2, line 44, "$Ch_2$-COO-alkyl" should read --- $CH_2$-COO-alkyl ---. Line 63, "$CH_2$-COOBalkyl" should read --- $CH_2$-COO-alkyl ---.

Column 3, line 56, --- the --- should be inserted after "in".

Column 4, line 63, "Ten" should read --- 10 ---.

Column 7, line 64, "percent" should read --- percent) ---.

Column 9, lines 62 through 75 should be deleted.

Column 10, lines 1 through 24 should be deleted.

Column 11, lines 21 through 25 should be deleted. Line 75, "-COO-alkyl", second occurrence, should be deleted.

Column 12, line 61, "an" should be deleted.

Signed and sealed this 23rd day of May 1972.

(SEAL)
Attest:

EDWARD M.FLETCHER,JR. ROBERT GOTTSCHALK
Attesting Officer Commissioner of Patents